United States Patent [19]
Mason et al.

[11] Patent Number: 5,621,875
[45] Date of Patent: Apr. 15, 1997

[54] METHOD AND SYSTEM FOR AUTOMATIC FORMATTING OF USER SELECTED TEXT

[75] Inventors: Christopher A. Mason, Woodinville; Devindra S. Chainani, Redmond; Pamela P. Ho; Susan M. Wilkins, both of Bellevue, all of Wash.

[73] Assignee: Microsoft Corp., Redmond, Wash.

[21] Appl. No.: 143,288

[22] Filed: Oct. 26, 1993

[51] Int. Cl.⁶ ........................................ G06F 17/24
[52] U.S. Cl. ................................. 395/793; 395/601
[58] Field of Search .............................. 395/146, 148, 395/150, 145, 147, 600; 364/419.1, 419.17

[56] References Cited

U.S. PATENT DOCUMENTS 5,070,478  12/1991  Abbott ............................. 364/419.17
5,079,724  1/1992  Shiraki et al. ......................... 395/146

OTHER PUBLICATIONS

Alfieri, "The best Book of WordPerfect Version 5.0", 1989, pp. 3, 6, 40, 46, 50–51, 63, 68, 70–71, 85–86, 202–206, 271.
Simpson, Mastering WordPerfect 5.1 & 5.2 for Windows, pp. 67–71. 1993.
WordPerfect for Windows version 5.1, selected screen printouts (5 pages). 1991.
Lotus Style Sheet Guide, *Ami Pro for Windows Release* 3.0, 1992, pp. 1–5.
Lotus User's Guide, *Ami Pro for Windows, Release* 3.0, 1992, Chapters 4, 6, 7, 8 and 9.
WordPerfect Workbook for IBM Personal Computers, Version 5.0, 1988, Lesson 5 (pp. 27–35) and Lesson 16 (pp. 124–139).

*Primary Examiner*—Joseph H. Feild
*Attorney, Agent, or Firm*—Seed and Berry LLP

[57] ABSTRACT

A method and system for automatic formatting of user selected text in a word processing system. A number of format options are displayed to the user and a text format selection is then obtained from the user for a selected format option. An identifier identifying the selected text format is stored in a text format data structure. One or more portions of existing text are thereafter selected by the user. For each selected portion of existing text, the selected portion is formatted with the text format identified by the identifier stored in the data structure. These steps are repeated until canceled by the user or until the user enters new text. In a preferred embodiment, the word processing system provides a conventional mode for performing conventional text formatting in which a text format is specified only after a single portion of existing text is selected by the user to which to apply the specified text format. The word processing system also provides an automatic formatting mode for automatically formatting any number of selected portions of text with a selected text format, as described above. By selecting a text format without first selecting a portion of existing text to which to apply the selected text format, the user places the word processing system in automatic formatting mode. Canceling the selected text format or entering new text converts the word processing system back to the conventional mode.

42 Claims, 6 Drawing Sheets

METHOD AND SYSTEM FOR AUTOMATIC FORMATTING OF USER SELECTED TEXT

TECHNICAL FIELD

The present invention relates generally to word processing systems and, more specifically, to a method and system for automatically formatting user selected portions of text.

BACKGROUND OF THE INVENTION

Word processing systems are widely used in homes and businesses to allow computer users to create and modify text within text documents. A word processing system is typically provided as a software application executable on a computer system having a computer and various peripheral devices. The software application, referred to herein as a word processing program, provides users with the capability of creating, inserting, deleting and arranging text. The computer has a memory that stores the word processing program and also stores files which represent the text documents as data. When the word processing program is executed, a user can create a text document by entering text and, if desired, modifying the text and then storing a file which represents the text document on a peripheral storage device. Or, a user can modify an existing text document by reading an appropriate file into memory from a peripheral storage device the text document as desired.

Modern word processing systems also provide a variety of features by which users can enhance the text documents they create on such systems. One such enhancement feature is text formatting. Text formatting allows users to select different text formats to be applied to text within a text document. These text formats include character formats, which are applied to one or more characters in the text document, and paragraph formats, which are applied to paragraphs in the text document. Well-known examples of character formats are bold, italics, underlining, and the like. Well-known examples of paragraph formats are left alignment, right alignment, single spacing, double spacing, indentation, and so on.

Text formatting can be applied to format new text to be entered into a text document, and to format existing text which is already in the text document. In formatting new text, the word processing system can simply apply a text format specified by the user to each new character typed into the text document. In formatting existing text, however, the word processing system must also obtain from the user a selection of what portion of the existing text is to be formatted. The conventional method employed is for the user to first select a portion of existing text to which to apply a text format, and then to select a text format to apply to that selected portion. For example, if the user wishes to underline a word, the user first selects the word using a keyboard, mouse, or pointing device, and thereafter specifies an underlining format using the keyboard, mouse, or pointing device to apply the underlining format to the selected word.

A disadvantage of the conventional text selection method described above is that once a portion of existing text has been selected, only that selected portion can be formatted by thereafter specifying the text format desired. That is, it is not possible to apply the same selected text format to other portions of existing text without having to re-select that same text format for each different portion. Unfortunately, there are some instances in which a user may wish to apply the same text format to a number of different portions of existing text in a document. To accomplish this with the conventional method, the user must re-select the same text format numerous times, and the operation becomes undesirably time-consuming. Also, because the user is relied on to select the text format each time, the text formatting becomes prone to error and inconsistency. In such a case, the conventional method completely fails to provide the user with an efficient means of formatting text.

A further disadvantage of the conventional method described above is that it is not considered by all users to be an intuitive method of formatting text. Many new users, particularly children, have found the approach awkward and counter-intuitive. To these users, it is unnatural to have to select the object of a text formatting operation before the operation itself can be specified. For example, before performing a text formatting operation, a user might formulate the thought:

I want to Underline the word Elizabeth now.
The user must then:
Select the word Elizabeth and then Underline.
Many new users find a selection in this order to be contrary to intuition. As a result, the word processing system takes longer to learn, and the practical use and enjoyment of the system is limited.

SUMMARY OF THE INVENTION

It is an object of the invention to provide an intuitive method of formatting text.

It is another object of the invention to provide a user with the capability of applying a selected text format to any portion of existing text thereafter selected.

It is yet another object of the invention to provide a user with the capability of applying a text format selected only once to any number of selected portions of existing text.

Still further objects of the invention will be apparent as the invention is more fully described.

The present invention accomplishes these objects with a method and system for automatic formatting of user selected text. A number of format options are displayed to the user. A text format selection is obtained from the user which is specified by selecting a format option and then indicating a desired text format available for that format option. An identifier identifying the text format selected is stored in a text format data structure. One or more selected portions of existing text are then obtained from the user. Upon selection, each selected portion is automatically formatted with the text format already selected by the user. Any number of portions of text can be selected to be automatically formatted with the selected text format. Each time a portion of existing text is selected, the identifier identifying the selected text format is read from the data structure and the selected portions are formatted with the text format identified. These steps are repeated until canceled by the user or until the user enters new text.

In a preferred embodiment, the inventive method is performed by a word processing system which also provides conventional text formatting where a text format is specified by the user after a single portion of existing text has already been selected by the user to which to apply the specified text format. Two different modes of text formatting are made available to the user: a conventional mode which provides such a conventional text formatting, and an automatic formatting mode which provides automatic formatting in accordance with the inventive method described above. While operating in the conventional mode, the word processing system converts to the automatic formatting mode when a text format is specified by the user without having first selected a portion of existing text. While operating in the automatic formatting mode, the word processing system converts to the conventional mode when either the automatic formatting mode is canceled by the user or when the user enters new text. Thus, the user can realize the advantages of both modes of text formatting.

DETAILED DESCRIPTION OF THE INVENTION

Figure 1:
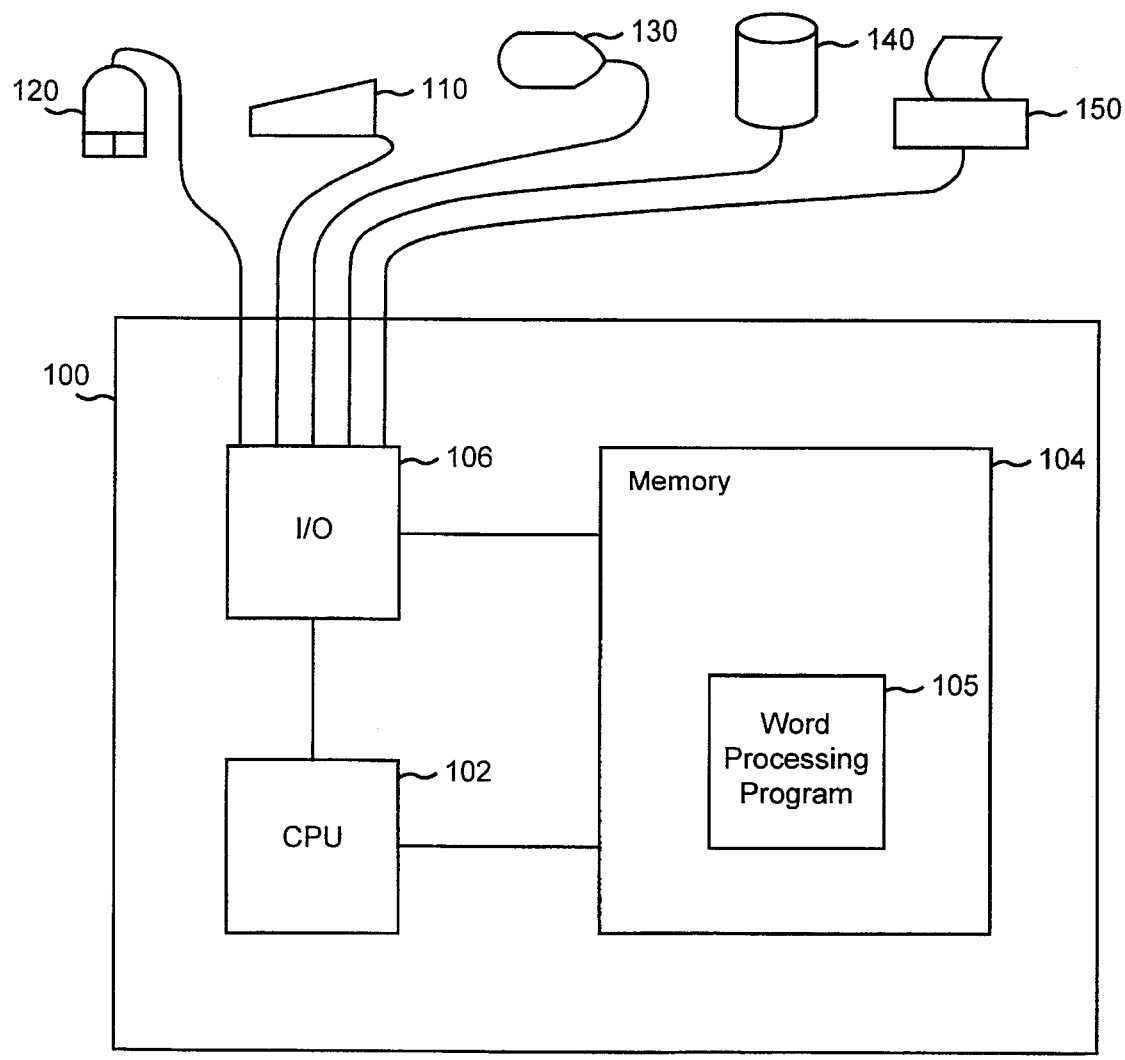
FIG. 1 is a block diagram of a computer system suitable for practicing a preferred embodiment of the invention.

A block diagram of a computer system suitable for practicing the preferred embodiment of the invention is shown in FIG. 1. It should be appreciated that the illustrated computer system is merely one example of a computer system capable of performing the inventive method described herein. The computer system in FIG. 1 includes a computer 100. The computer 100 contains a central processing unit (CPU) 102 that communicates with a memory 104. The memory stores a word processing program 105 and various other data and files. The word processing program 105 performs the preferred method of the present invention. The CPU 102 also communicates, via an input/output unit (I/O) 106, with a keyboard 110, a mouse 120, a screen display 130, a peripheral storage device 140 and a printer 150.

Figure 2:
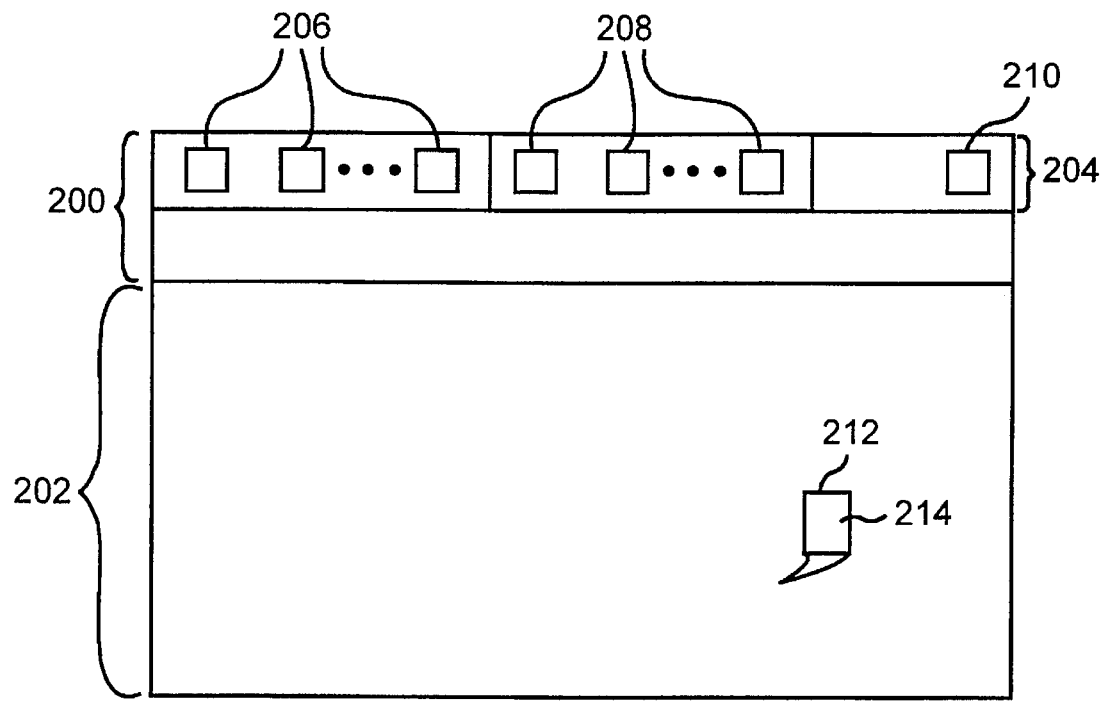
FIG. 2 is an illustration of the computer screen layout provided to the user in the preferred embodiment.

The computer screen layout that is provided to the user in the preferred embodiment is shown in FIG. 2. The computer screen layout is displayed by the display 130 from FIG. 1. The computer screen layout comprises a toolbar 200 and a text area 202. The toolbar 200 includes a text formatting portion 204. The text formatting portion 204 is a dialog box which contains a number of character buttons 206, paragraph buttons 208 and a cancel button 210. The text area 202 contains text entered by the user. The text area 202 also includes a text selection cursor 212 with a format indication area 214. The text entry cursor 212 is a specialized cursor which replaces the typical on-screen cursor when the on-screen cursor is moved into the text area 202 and is controlled by the user in the same fashion.

The method of the preferred embodiment, as will be explained in more detail below, is performed in accordance with the input from the user with reference to the computer screen layout shown in FIG. 2. The preferred word processing system which performs this method operates in two modes: a conventional mode and an automatic formatting mode. When the user enters text, the system converts to conventional mode, if not already operating therein. The text is entered by the user via the keyboard 110 and displayed in the text area 202. When the user wishes to format a portion of existing text in the conventional mode, the user selects the portion of text to be formatted before selecting the text format to be applied to the selected portion. The user selects the text by using the mouse 120 to position the text selection cursor 212 at a desired location and dragging the text entry cursor 212 over a desired paragraph or set of characters. The user thereafter selects a text format by positioning the on-screen cursor on a character button 206 or paragraph button 208 and clicking the mouse 120. For example, the user would italicize a portion of text selected from the text area 202 by clicking the mouse 120 on a character button 206 to choose the italics format to be "on" with respect to the one single selected portion of text.

When the user wishes to automatically format one or more portions of existing text in the automatic formatting mode, the user first selects a text format without having previously selected a portion of existing text to which to apply the selected text format. When this selection is made, the preferred word processing system converts to automatic formatting mode, if not already operating therein. The user selects the text format by positioning the on-screen cursor on a character button 206 or paragraph button 208 and clicking the mouse 120. For example, the user would choose to automatically italicize the characters contained in each portion of existing text thereafter selected by clicking the mouse 120 on the appropriate character button 206. Similarly, the user could choose to automatically apply a text format, such as indentation, to paragraphs thereafter selected by clicking the mouse 120 on an appropriate paragraph button 208. The system remains in automatic formatting mode as long as the user continues to select portions of existing text, and thereafter converts to the conventional mode if the user selects the cancel button 210 or enters new text in the text selection area 202.

In some instances, such as with bold or italics, there are only two selectable text formats per character button 206 or paragraph button 208. In such a case, the text format can be selected simply by selecting the relevant button 206 or 208 to turn the text format on or off. In other cases, a text format is selectable from a number of possible text formats within a single "format option." For example, a format option for color selection includes many selectable colors as possible text formats. Where only two possible text formats exist within a format option, the format option is selected by the user by simply selecting an appropriate character button 206 or paragraph button 208, and the text format is selected by toggling the selected button to set the corresponding text format to be on or off. Where a format option includes a number of possible text formats, however, the format option is selected by the user by selecting the appropriate button 206 or 208, and this selection leads to a menu for selection of a text format within the selected format option. For example, upon selecting a "color" format option from an appropriate character option selection area 206, a pop-down menu is provided from which the user can select a text format such as "blue," "green," etc.

Figure 3:
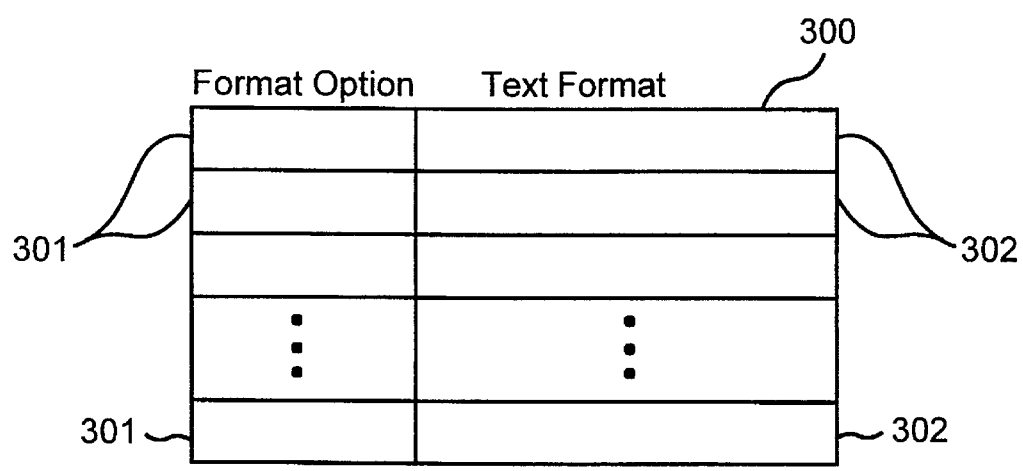
FIG. 3 is an illustration of the data structure provided by the preferred embodiment in which a representation of a currently specified text format is maintained for each format option.

In order to consistently apply a text format chosen by the user in the automatic formatting mode, the preferred embodiment provides, as shown in FIG. 3, a text format data structure 300 in which a representation of a currently specified text format is maintained for each format option provided in the automatic formatting mode. The text format data structure 300 is stored in the memory 104, and is accessed by the word processing program 105 to read or store a representation of a text format for a given format option. The text format data structure 300 includes a format option field 301 and a format status field 302 for each format option provided. Each format option field 301 contains a string as an identifier identifying a different format option. Each format status field 302 contains a status string as an identifier identifying a most recently selected text format, if any, for the corresponding format option. Depending on the nature of the text format represented, the status string may be a Boolean string indicating that a format is turned "ON" or "OFF," or may contain one of a set of string values representing different text formats such as "BLUE", "GREEN," etc.

The format options and corresponding text formats may include, but are not limited to, the following examples:

| Format Options | Text Formats |
|---|---|
| Character Options | |
| BOLD | ON or OFF |
| ITALICS | ON or OFF |
| UNDERLINE | ON or OFF |
| FONT | ARIAL, COURIER, etc. |
| SIZE | 10, 12, 14, etc. |
| COLOR | BLUE, GREEN, etc. |
| Paragraph Options | |
| INDENT | ON or OFF |
| SPACING | SINGLE, DOUBLE, etc. |
| ALIGN LEFT | ON or OFF |
| ALIGN RIGHT | ON or OFF |

It should be appreciated that the present invention can perform the inventive method to provide automatic formatting with a variety of text formats within a variety of format options, and that the format options and text formats mentioned herein are merely examples of format options and text formats which could fall within this variety. Also, although the text format data structure is described with reference to string values identifying the format options and text formats, it should be appreciated that a variety of different types of data structures or identifiers could be utilized to maintain the format options and text formats.

Figure 4:
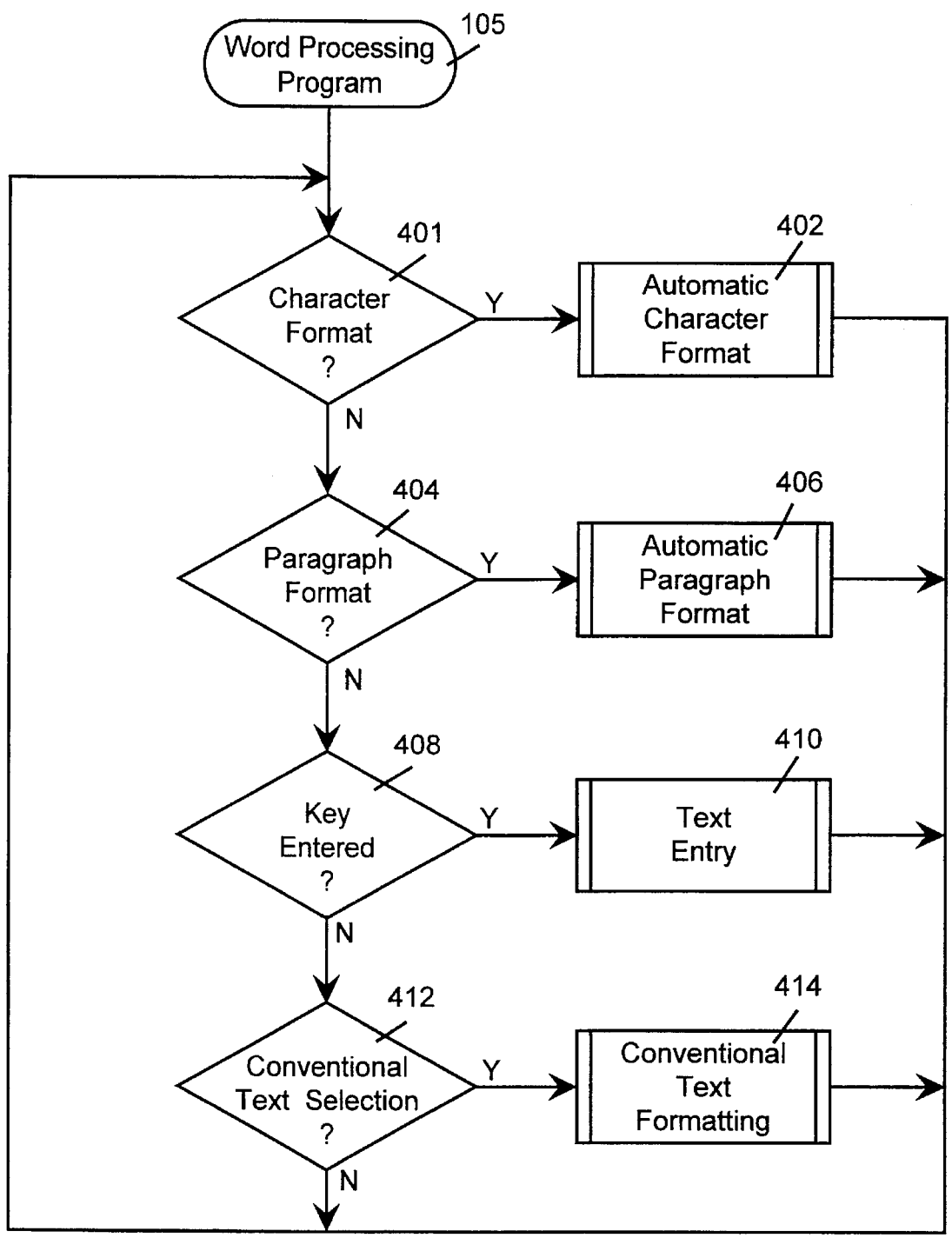
FIG. 4 is a flow diagram of the main portion of a word processing program that incorporates the preferred embodiment.

The portion of the word processing program 105 that performs the preferred method is shown in FIG. 4. The main program continually checks for user input and processes the user input by calling appropriate routines. It will be understood that only the steps that perform the inventive method are illustrated, and that such a word processing program would perform many operations in addition to those explained herein, such as cursor location, insertion, reading in a text document having existing text, etc. The design of such functions is well known in the art. One of ordinary skill will appreciate that the inventive method described herein can be readily incorporated into the logic of a word processing system having the fundamental capability of formatting an item of text. In such a case, the functions represented by the inventive steps illustrated in the main portion of the word processing program and in the routines called by this main portion will be accompanied by other word processing functions.

The word processing program 105 determines in step 401 whether a text format has been selected by the user for automatic formatting which is a character format. The user indicates such a selection by selecting a character button 206 from the text formatting portion 204 of the toolbar 200 shown in FIG. 2 without first selecting a portion of text to format. If a character format has been so selected, the word processing program branches to step 402, wherein a routine Automatic Character Format is called to automatically format each of the portions of existing text thereafter selected by the user with the character format selected. This routine will be explained in detail below. After the routine has been performed, control returns to the word processing program 105 and loops back to step 401.

If the word processing program 105 determines in step 401 that a character format has not been selected for automatic formatting, then the program proceeds to step 404. The program determines in step 404 whether a text format has been selected by the user for automatic formatting which is a paragraph format. The user indicates such a selection by selecting a paragraph button 208 without previously having selected a portion of text to format. If a paragraph format has been selected, the word processing program branches to step 406, wherein a routine Automatic Paragraph Format is called to automatically format the paragraph or paragraphs thereafter selected by the user with the paragraph format selected. This routine will be explained in detail below. After the routine has been performed, control returns to the word processing program 105 and loops back to step 401.

If the word processing program 105 determines in step 404 that a paragraph format has not been selected, then the program proceeds to step 408. In step 408, the program determines whether new text has been entered by the user through, for example, the keyboard 110. If new text has been entered, then control branches to step 410, wherein a routine Text Entry is called. The Text Entry routine processes text entered by the user and continues to check for user selections of character and paragraph formats for automatic formatting, which will convert the system to automatic formatting mode. The Text Entry routine will be explained in detail below. After the routine has been performed, control returns to the word processing program 105 and loops back to step 401.

If it is determined in step 408 that text has not been entered, control proceeds to step 412. In step 412, the routine determines whether a conventional text selection has been made. A conventional text selection occurs when the user selects a single portion of existing text prior to selecting a text format to apply to the selected portion. If the word processing program determines in step 412 that a conventional text selection has been made, then control branches to step 414, wherein the system converts to conventional mode and conventional text formatting is performed to format the single portion of text. Control then loops back to step 401. The word processing program then continues to check for user selection of a character format or paragraph format, or text entry. It should be noted that the input-checking processing steps (such as steps 401, 404, and 408) are illustrated serially for simplicity of explanation, although these steps can be easily applied in an interrupt-driven environment wherein user input is determined when an appropriate interrupt is received.

Figure 5:
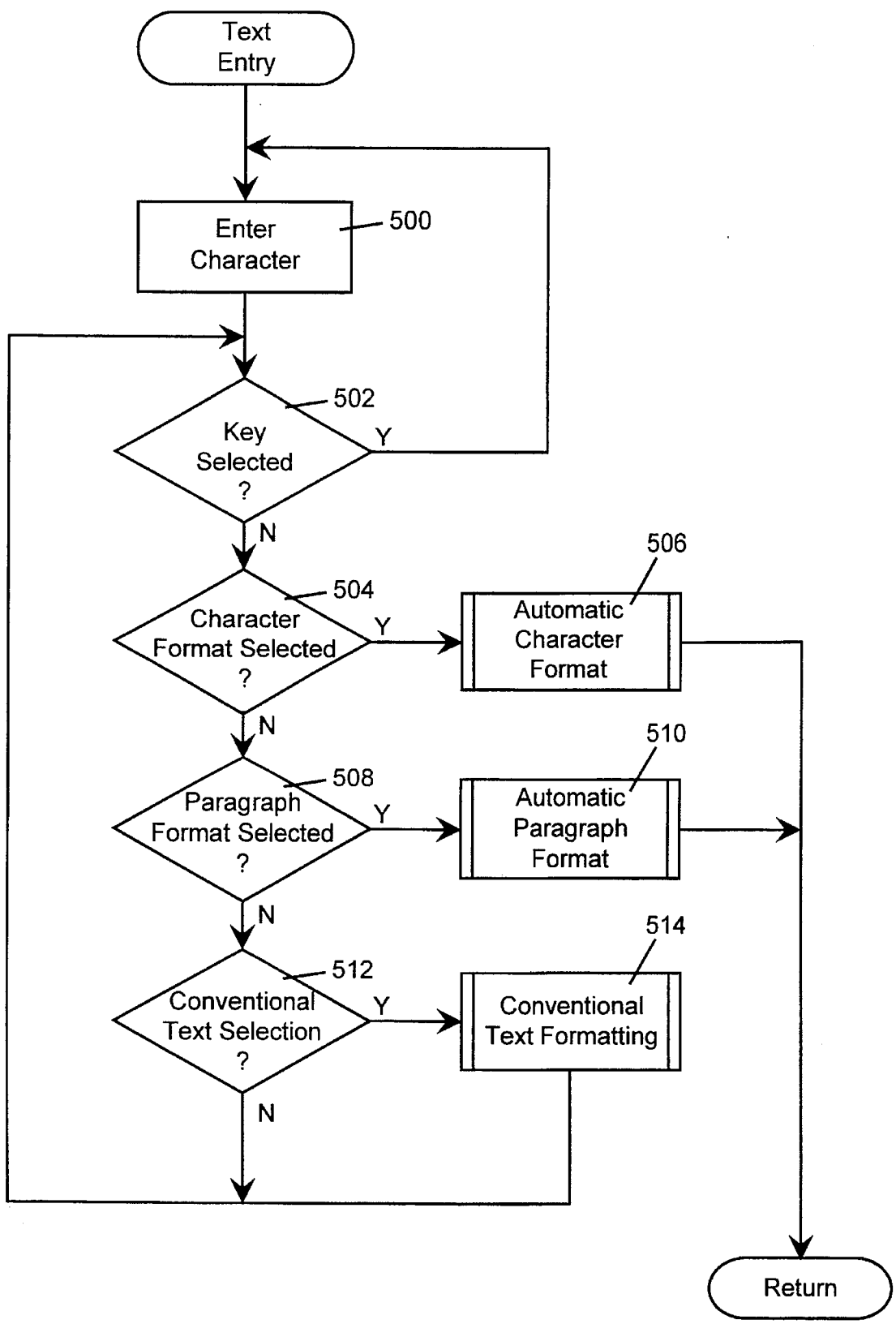
FIG. 5 is a flow diagram of a Text Entry routine using the preferred embodiment.

A flow diagram of the Text Entry routine is shown in FIG. 5. The Text Entry routine is called by the word processing program 105 and by other routines that will be explained below. In step 500, the Text Entry routine enters into the relevant text document the character corresponding to the key selected by the user via the keyboard 110. This is done by performing the conventional word processing operations of storing data representations of the character in a file stored on the memory 104 which contains the relevant text document, and displaying graphical representations of the character on the text area 202 with the display 130. In step 502, if a key is again selected by the user, then control loops back to step 500 where the Text Entry routine enters the character represented by the selected key. Where a most recent selection has been made in the Automatic formatting mode, the character is formatted with the character formats most recently selected. Steps 500 and 502 are repeated as long as the user enters text via the keyboard 110.

If the Text Entry routine determines in step 502 that text has not been entered, control proceeds to step 504, wherein the routine determines whether a text format has been selected by the user for automatic formatting which is a character format. This determination is performed in the same manner as in step 401 of the word processing program 105, which has been explained with reference to FIG. 4. If the Text Entry routine determines in step 504 that a character format has been selected for automatic formatting, then control branches to step 506. In step 506, the routine Automatic Character Format is called and the word processing system converts to automatic formatting mode. The Automatic Character Format routine automatically formats the characters in each of the portions of existing text thereafter selected by the user with the selected character format and applies the selected character text format to portions of text thereafter selected by the user. The Automatic Character Format routine will be explained in detail below.

If the Text Entry routine determines in step 504 that a character format has not been selected, then control proceeds to step 508 wherein the routine determines whether a text format has been selected for automatic formatting which is a paragraph format. This determination is performed in the same manner as in step 404 of the word processing program 105, which has been explained with reference to FIG. 4. If the routine determines in step 508 that a paragraph format has been selected for automatic formatting, then control branches to step 510. In step 510, the Automatic Paragraph Format routine is called and the word processing system converts to automatic formatting mode. Similar to the Automatic Character Format routine, the Automatic Paragraph Format routine automatically formats the paragraph or paragraphs thereafter selected by the user with the selected paragraph text format. The Automatic Paragraph Format routine will also be explained in detail below.

If the Text Entry routine determines in step 508 that a paragraph format has not been selected, then control proceeds to step 512. In step 512, the Text Entry routine determines whether a conventional text selection has been made. A conventional text selection occurs when the user selects a portion of existing text prior to selecting a text format to which to apply to that selected text portion. This selection is made, for example, by dragging the mouse 120 from a first character to be selected over any number of characters to a last character to be selected. If the Text Entry routine determines in step 512 that a conventional text selection has been made, then control branches to step 514. In step 514, the word processing program 105 performs conventional text formatting, in which a single portion of existing text is selected before a text format to be applied to that portion is selected. The invention then converts to automatic formatting mode, wherein the text format selected in step 514 is automatically applied to text thereafter selected. The Text Entry routine loops back to step 502, where it applies the selected character format or paragraph format.

Figure 6:
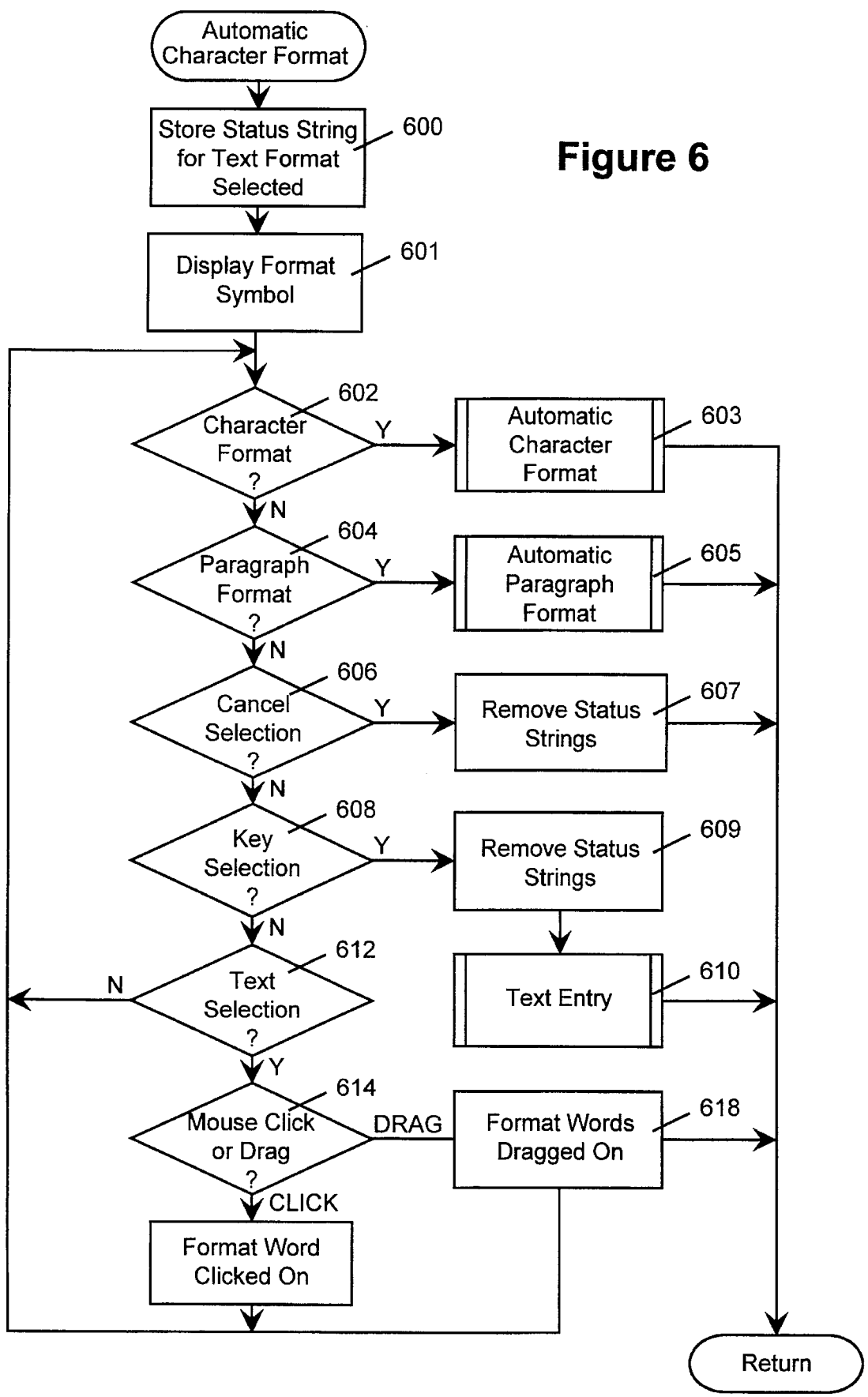
FIG. 6 is a flow diagram of an Automatic Character Format routine using the preferred embodiment.

A flow diagram of the Automatic Character Format routine, referred to above with respect to FIGS. 4 and 5, is shown in FIG. 6. The Automatic Character Format routine operates in the automatic formatting mode to automatically apply the selected character format to any number of portions of existing text thereafter selected by the user. The selected character format is so applied until the user exits the automatic formatting mode or enters new text from the keyboard 110. The Automatic Character Format routine is called by the word processing program 105 and by the Text Entry routine of FIG. 5. Whenever the Automatic Character Format routine is called, the word processing system converts to automatic formatting mode, if not already operating therein.

In step 600, the Automatic Character Format routine sets the selected character format to be automatically applied to the text selected by the user. The routine sets the character format by storing a status string as an identifier identifying the selected character format in the format status field 302 of the text format data structure 300, shown in FIG. 3. For example, if a bold character format has been selected by the user, then the status string "ON" is stored in the format status field 302 corresponding to the format option field 301 containing the string "BOLD". In step 601, the Automatic Character Format routine indicates that a character format has been set to be automatically applied. The routine indicates this by displaying the selection cursor 212 in a form specific to character selection. When a paragraph format is selected instead of, or in addition to, a character format, the selection cursor 212 is instead displayed in a form specific to paragraph selection. Alternatively, the selection cursor 212 contains a format indication area 214, as shown in FIG. 2, and indicates the specifically selected character format by displaying an appropriate symbol in the format indication area 214. This symbol could be a character, such as "I" for italics, or an icon, a color, etc., as screen space and resolution permits. In the alternative embodiment wherein multiple text formats are selected, the multiple character formats would be indicated with multiple symbols in the format indication area 214 of the text selection cursor 212, also as screen space and resolution permits. The format symbol remains displayed in the format indication area 214 for as long as the selected text format remains selected to be automatically applied in the automatic formatting mode.

In step 602, the routine determines whether an additional character format has been selected by the user. If so, control branches to step 603, wherein the Automatic Character Format routine is again called to apply the additional character format. If not, control proceeds to step 604, wherein the routine determines whether a paragraph format has been selected by the user. If so, control branches to step 605, wherein the Automatic Paragraph Format routine is called to additionally apply the paragraph format selected. If not, control proceeds to step 606. After performing either the Automatic Character Format or the Automatic Paragraph Format routine, the routine returns.

In step 606, the Automatic Character Format routine determines whether the cancel button 210, shown in FIG. 2, has been selected by the user to cancel the selected character format. If so, the routine branches to step 607 wherein the status strings in the format status fields 302 are removed and the word processing system 105 converts to the conventional mode. The routine then returns. If the Automatic Character Format routine determines in step 606 that the user has not selected the cancel button 210, then control proceeds to step 606. The routine determines in step 606 whether the user has selected a key on the keyboard 110 to enter new text. If so, control branches to step 609 wherein the routine removes the status strings stored in the format status fields 302 of the text format data structure 300. Control then proceeds to step 610 wherein the Text Entry routine, shown in FIG. 5, is called and the word processing system converts to the conventional mode. The Text Entry routine enters the text into the text document, as has been explained. The Automatic Character Format routine then returns.

If the Automatic Character Format routine determines in step 606 that a key has not been selected, then control proceeds to step 612 wherein the routine determines whether the user has initiated a text selection indicating a portion of text to which to apply the character format selected in the automatic formatting mode. The user initiates a text selection by moving the mouse 120 to position the text selection cursor 212 on a word displayed on the display 130, and then depressing the mouse button on the mouse 120 while the text selection cursor 212 is so positioned. If the user has not initiated a text selection, then the routine loops back to step 606 and continues to check for user input in step 606 608 and 612. If the Automatic Character Format routine determines in step 612 that the user has initiated a text selection, then control proceeds to step 614. In step 614, the routine determines whether the user has clicked the mouse 120 on a single word or dragged the mouse across multiple words. The user clicks the mouse 120 on a single word by releasing the depressed mouse button while the text selection cursor 212 is positioned anywhere on the displayed word. The user drags the mouse 120 across multiple words by holding the mouse button down and moving the mouse 120 to move the cursor from anywhere on the first word initially selected to a position anywhere on a last word to be selected.

If, in step 614, the Automatic Character Format routine determines that the user has clicked on a word, then control proceeds to step 616. In step 616, the routine reads the text format data structure 300, shown in FIG. 3, and formats each character in the word clicked on to have the text formats indicated in the format status fields 302 as selected by the user. The formatting of a given character or set of characters is a conventional operation well-known to those skilled in the art. An insertion point which defines the location and format of characters thereafter typed is also formatted to have the character format selected. The routine then loops back to step 606 to continue to check for user input. Thereafter, text entered in step 608 also has the selected character format.

If the routine determines that the user has dragged the mouse 120 across multiple words, control branches to step 618 wherein the routine formats each character in each of the multiple words, from the first to last word selected, to have the text formats indicated in the format status fields 302 as selected by the user. The insertion point is also formatted to have the character format selected. The routine then loops back to step 606 to continue to check for user input. If the user neither clicks nor drags the mouse in step 614, control loops to step 602, and the routine continues to check for user input.

Figure 7:
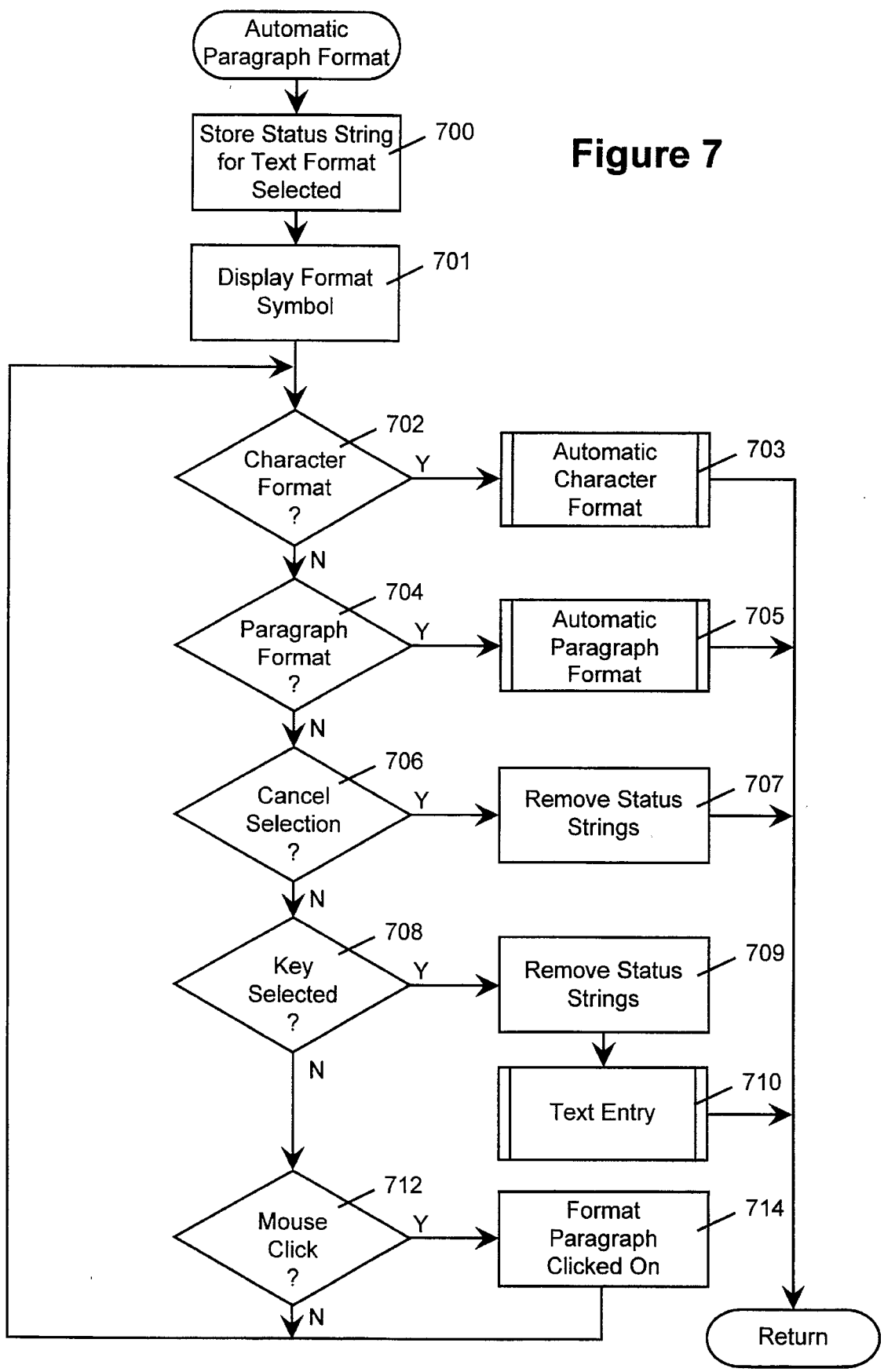
FIG. 7 is a flow diagram of an Automatic Paragraph Format routine using the preferred embodiment.

A flow diagram of the Automatic Paragraph Format routine referred to above with respect to FIGS. 4 and 5, is shown in FIG. 7. The Automatic Paragraph Format routine sets the paragraph format to be automatically applied to the text thereafter selected by the user. The routine sets the paragraph format by storing a status string representing the selected paragraph format in the corresponding format status field 302 of the text format data structure 300, shown in FIG. 3. The selected paragraph format is automatically applied to a paragraph or paragraphs thereafter selected by the user until the user cancels the text brush or enters text from the keyboard 110. The Automatic Paragraph Format routine is called by the word processing program 105 and the Text Entry routine of FIG. 5. Whenever the Automatic Paragraph Format routine is called, the word processing system converts to the automatic formatting mode.

In step 700, the Automatic Paragraph Format routine sets the selected paragraph format to be automatically applied to the text selected by the user by storing a status string identifying the selected paragraph format in an appropriate format status field 302 of the text format data structure 300 shown in FIG. 3. For example, if the selected format option is for line spacing and the selected paragraph format is single spacing, then the selected paragraph format string value "SINGLE" is stored in the format status field 302 corresponding to the format option field 301 containing the string "SPACING". In an alternative embodiment, the routine sets any number of paragraph formats selected by the user, storing an appropriate status string in the format status field 302 provided for each.

In step 701, the Automatic Paragraph Format routine indicates that a paragraph format has been set to be automatically applied by displaying the selection cursor 212 in a form specific to paragraph selection, as discussed above. Alternatively, the specifically selected paragraph format is indicated by displaying an appropriate symbol in the paragraph format area 214 of the text selection cursor 212, shown in FIG. 2, which indicates the selected paragraph format. The symbol remains displayed in the format indication area 214 for as long as the selected format remains selected to be automatically applied. In step 702, the routine determines whether a character format has been additionally selected by the user. If so, control branches to step 703, wherein the Automatic Character Format routine is called to apply the character format. If not, control proceeds to step 704, wherein the routine determines whether an additional paragraph format has been selected by the user. If so, control branches to step 705, wherein the Automatic Paragraph Format routine is called to apply the paragraph format selected. If not, control proceeds to step 706. After performing either the Automatic Character Format routine or the Automatic Paragraph Format routine, the routine returns.

In step 706, the routine determines whether the user has selected the cancel button 210, shown in FIG. 2, to cancel the selected paragraph format. If so, control branches to step 707. In step 707, the routine removes the status strings in the format status fields 302 of the text format data structure 300 and the word processing system converts to the conventional mode. The routine then returns. If the Automatic Paragraph Format routine determines in step 706 that the user has not selected the cancel button 210, then control proceeds to step 708. If the routine determines in step 708 that the user has entered new text by selecting a key on the keyboard 110, then control branches to step 709. In step 709, the routine removes the status strings in the format status fields 302 in the text format data structure 300 and the word processing system converts to the conventional mode. Control then proceeds to steps 710 wherein the Text Entry routine of FIG. 5 is called. The Text Entry routine enters text into the text document, as has been explained. The routine then returns.

If the Automatic Paragraph Format routine determines in step 708 that a key has not been selected from the keyboard 110, then control proceeds to step 712. If the routine determines in step 712 that the user has clicked the mouse 120 on a paragraph, then control branches to step 714. The routine determines that the mouse has been clicked on a paragraph if the user moves the mouse 120 to position the text selection cursor 212 on the paragraph and then depresses and releases the mouse button of the mouse 120.

In step 714, the routine formats the paragraph clicked on to have the selected text format as indicated in the format status fields 302 in the text format data structure 300. The routine then loops back to step 706 and continues to check for user input in steps 706, 708, and 712.

It should be appreciated that, while the present invention has been described above with reference to a specific embodiment, the specific embodiment is only one example of an implementation of the inventive concept. Various modifications may be made without departing from the spirit and scope of the invention. As such, the scope of the invention is not limited to the specific embodiment described herein, but is properly defined by the claims.

We claim:

1. A method of formatting text in a computer system having a display and a pointing device, the method comprising the steps of:

displaying text on the display;

receiving from a user an indication of a text format to be applied to portions of displayed text; and in response to the user selecting each of a plurality of non-contiguous portions of the displayed text by using the pointing device to point to each portion, formatting and redisplaying each selected portion of the displayed text in accordance with the received indication of the text format before receiving from the user any additional indications of text format.

2. The method of claim 1 wherein the step of formatting and redisplaying each selected portion of the displayed text occurs in accordance with the received text format until an indication is received from the user canceling the received indication of the text format.

3. The method of claim 2, further comprising the steps of:

receiving, after the received indication of the text format has been canceled by the user, an indication of a portion of the displayed text selected by the user;

receiving, after receiving the indication of the selected portion, an indication of a text format from the user; and formatting and redisplaying the selected portion of the displayed text in accordance with the received indication of the text format.

4. The method of claim 1 wherein the step of formatting and redisplaying each selection of the displayed text occurs in accordance with the received indication of the text format until the user enters text.

5. The method of claim 4 wherein the entered text is formatted with the received indication of the text format.

6. The method of claim 4, further comprising the steps of:

receiving, after the text has been entered by the user, an indication of a portion of the displayed text selected by the user;

receiving, after receiving the indication of the selected portion, an indication of a text format from the user; and formatting and redisplaying the selected portion of the displayed text in accordance with the received indication of the text format.

7. The method of claim 5, further comprising the steps of:

receiving, after the text has been entered by the user, an indication of a portion of the displayed text selected by the user;

receiving, after receiving the indication of the selected portion, an indication of a text format from the user; and formatting and redisplaying the selected portion of the displayed text in accordance with the received indication of the text format.

8. The method of claim 1 wherein:

receiving an indication of a text format comprises receiving an indication of a character format; and formatting each selected portion of the displayed text comprises formatting each character within the selected portion in accordance with the received indication of the character format.

9. The method of claim 1 wherein:

receiving an indication of a text format comprises receiving an indication of a paragraph format; and formatting each selected portion of the displayed text comprises formatting each paragraph within the selected portion in accordance with the received indication of the paragraph format.

10. The method of claim 1 wherein:

receiving an indication of a text format comprises receiving indications of multiple text formats from the user; and formatting and redisplaying each selected portion of the displayed text comprises formatting and redisplaying the selected portion of the displayed text in accordance with the received indication of the text formats.

11. The method of claim 1, further comprising the step of displaying on the display a cursor which indicates that a text format has been received.

12. The method of claim 1, further comprising the step of displaying on the display a cursor which identifies the received text format.

13. The method of claim 1 wherein the step of receiving an indication of a text format from a user includes the user selecting a portion of the displayed text which is displayed in accordance with the text format the user desires to indicate.

14. A computer readable storage medium upon which is stored a program for controlling a computer system to perform in accordance with the method of claim 1.

15. A word processing system for formatting text, the word processing system comprising:

a display for displaying text;

an input means for receiving an indication of a text format from a user, the text format for being applied to non-contiguous portions of displayed text;

means for the user to select a plurality of portions of the displayed text; and means for formatting each of the selected portions of the displayed text in response to the user selecting each portion and in accordance with the indication of the text format received by the input means without receiving from the user any other indication of the text format.

16. The word processing system of claim 15 wherein:

the input means is for receiving multiple indications of text formats from the user; and each means for formatting the selected portion of the displayed text comprises means for formatting each selected portion in accordance with the received indications of the text formats.

17. The word processing system of claim 15, further comprising means for displaying on the display a cursor which indicates that a text format has been received.

18. A method of formatting data in a computer system having a display and a user input device, the method comprising:

displaying data on the display;

displaying a visual button on the display which represents a data format for formatting data;

selecting the visual button with the user input device in order to select a data format;

after selecting the visual button, selecting each of a plurality of non-contiguous portions of the displayed data by using the user input device to point to the portion; and in response to selecting each of the non-contiguous portions, formatting and redisplaying each selected portion of the displayed data in accordance with the selected data format.

19. The method of claim 18 further comprising after selecting the visual button, displaying a cursor on the display which indicates the selected data format.

20. A method of formatting data in a computer system having a display and a user input device, the method comprising:

displaying data on the display;

receiving from a user a data format to be applied to portions of displayed data; and in response to the user selecting each of a plurality of non-contiguous portions of the displayed data by using the user input device, formatting and redisplaying each selected portion of the displayed data in accordance with the received data format until an additional data format is received from a user to be applied to portions of the displayed data.

21. The method of claim 20 wherein formatting and redisplaying each selected portion of the displayed data occurs in accordance with the received data format until an indication is received from the user canceling the received data format.

22. The method of claim 20 wherein formatting and redisplaying each selected portion of the displayed data occurs in accordance with the received data format until the user enters data.

23. The method of claim 20 wherein:

receiving an indication of a data format comprises receiving indications of multiple data formats from the user; and formatting and redisplaying each selected portion of the displayed data comprises formatting and redisplaying the selected portion of the displayed data in accordance with all of the multiple received data formats.

24. The method of claim 20 further comprising displaying on the display a cursor which indicates that a data format has been received.

25. The method of claim 24 wherein the displayed cursor indicates that a character format or a paragraph format has been received.

26. The method of claim 20 further comprising displaying on the display a cursor which identifies the received data format.

27. The method of claim 20 wherein the step of receiving an indication of a data format from a user includes the user selecting a portion of the displayed data which is displayed in accordance with the data format the user desires to indicate.

28. A computer readable storage medium upon which is stored a program for controlling a computer system to perform in accordance with the method of claim 20.

29. A method in a computer system for selecting a mode for formatting data displayed on a display, the method comprising:

when a user selects a first data format without a portion of the displayed data being currently selected, entering an automatic formatting mode for formatting the displayed data, the automatic formatting mode including, in response to the user selecting each of a plurality of non-contiguous portions of the displayed data, formatting each selected portion in accordance with the selected first data format without the user selecting any other data format; and when the user enters data to be displayed on the display, entering a manual formatting mode for formatting the data displayed on the display, the manual formatting mode including:

the user selecting a portion of the data displayed on the display;

after the user selects the portion of the data displayed on the display, the user selecting a second data format; and formatting the selected portion of the data displayed on the display in accordance with the selected second data format.

30. The method of claim 29 further comprising when the user cancels a currently selected data format, entering the manual formatting mode.

31. The method of claim 29 wherein:

the automatic formatting mode further includes displaying a cursor on the display which indicates the selected first data format; and the manual formatting mode further includes displaying a cursor on the display which indicates the selected second data format.

32. The method of claim 29 wherein the automatic formatting mode further includes displaying a cursor on the display which indicates that the automatic formatting mode has been entered.

33. A method in a computer system for indicating that the computer system has entered an automatic formatting mode for formatting data displayed on a display, the method comprising:

displaying data on the display;

entering the automatic formatting mode, the automatic formatting mode including, in response to a user selecting each of a plurality of non-contiguous portions of the displayed data, formatting and redisplaying each selected portion in accordance with a data format selected by the user and without the data format being re-selected by the user for each of the plurality of portions; and displaying on the display a pointer which indicates that the computer system has entered the automatic mode.

34. A computer-readable medium containing instructions for causing a computer system to format data in a computer system having a display and a user input device, by:

displaying data on the display;

displaying a visual button on the display which represents a data format for formatting data;

selecting the visual button with the user input device in order to select a data format;

after selecting the visual button, selecting each of a plurality of non-contiguous portions of the displayed data by using the user input device to point to each portion; and in response to selecting each of the non-contiguous portions, formatting and redisplaying each selected portion of the displayed data in accordance with the selected data format.

35. The computer-readable medium of claim 34 further comprising after selecting the visual button, displaying a cursor on the display which indicates the selected data format.

36. A computer-readable medium containing instructions for causing a computer system to format data, the computer system having a display and a user input device, by:

displaying data on the display;

receiving from a user a data format to be applied to portions of displayed data; and in response to the user selecting each of a plurality of non-contiguous portions of the displayed data by using the user input device, formatting and redisplaying each selected portion of the displayed data in accordance with the received data format without receiving from the user any additional data format.

37. The computer-readable medium of claim 36 wherein formatting and redisplaying each selected portion of the displayed data occurs in accordance with the received data format until an indication is received from the user canceling the received data format.

38. The computer-readable medium of claim 36 wherein formatting and redisplaying each selected portion of the displayed data occurs in accordance with the received data format until the user enters data.

39. The computer-readable medium of claim 36 wherein:

receiving an indication of a data format comprises receiving indications of multiple data formats from the user; and formatting and redisplaying each selected portion of the displayed data comprises formatting and redisplaying each selected portion of the displayed data in accordance with all of the multiple received data formats.

40. The computer-readable medium of claim 36 further comprising displaying on the display a cursor which indicates that a data format has been received.

41. The computer-readable medium of claim 40 wherein the displayed cursor indicates that a character format or a paragraph format has been received.

42. The computer-readable medium of claim 36 further comprising displaying on the display a cursor which identifies the received data format.

* * * * *